Jan. 5, 1926.  
L. V. STONE ET AL  
1,568,927
RADIO PLATE BATTERY BOX
Filed Nov. 21, 1924     3 Sheets-Sheet 1
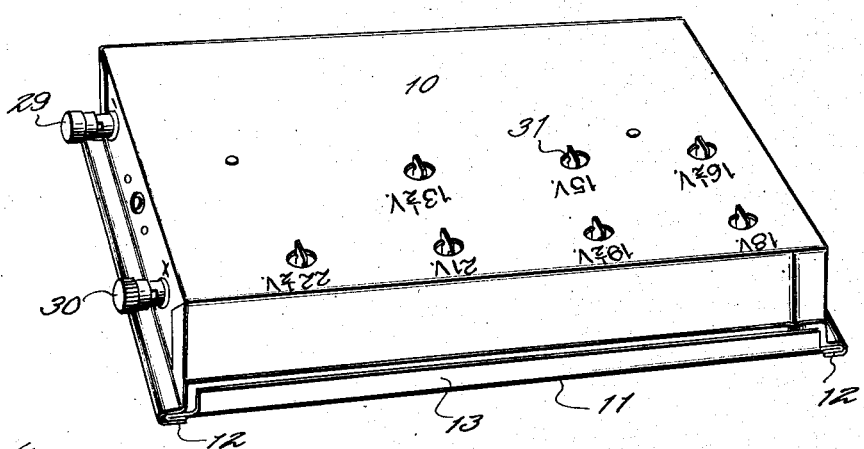
WITNESSES:  
R. E. Wise
INVENTORS  
L. V. Stone  
W. E. Bailey  
BY Victor J. Evans  
ATTORNEY Jan. 5, 1926.  
L. V. STONE ET AL  
1,568,927  
RADIO PLATE BATTERY BOX  
Filed Nov. 21, 1924  3 Sheets-Sheet 2
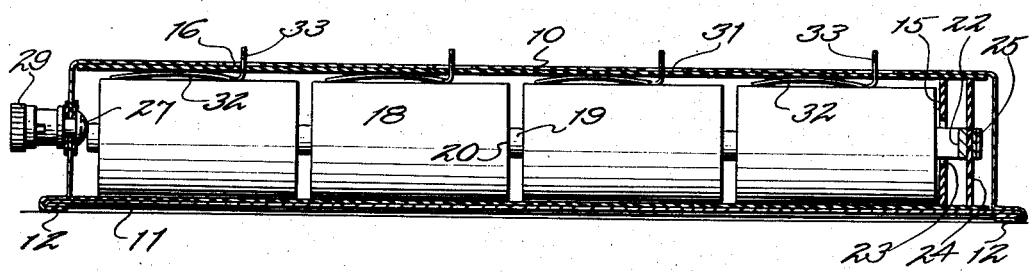
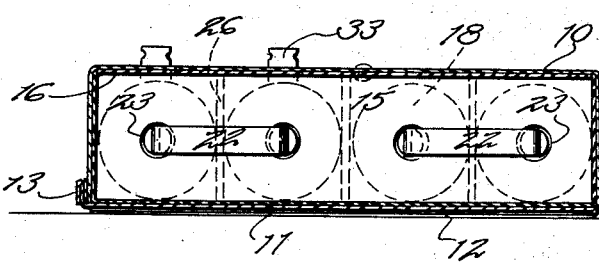
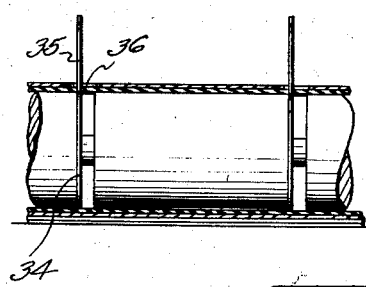
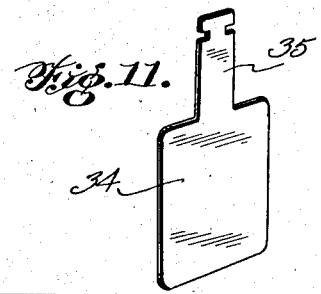
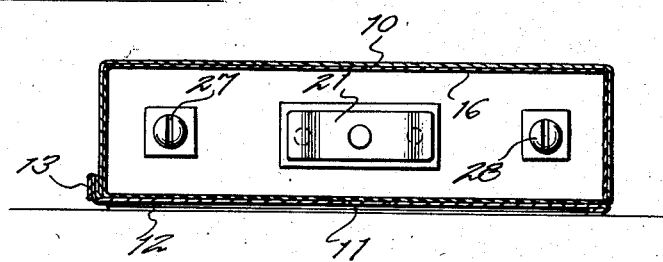
L. V. Stone  
W. E. Bailey  INVENTORS  
BY Victor J. Evans  
ATTORNEY
WITNESS:  
R. E. Wise Jan. 5, 1926. 1,568,927
L. V. STONE ET AL
RADIO PLATE BATTERY BOX
Filed Nov. 21, 1924   3 Sheets-Sheet 3
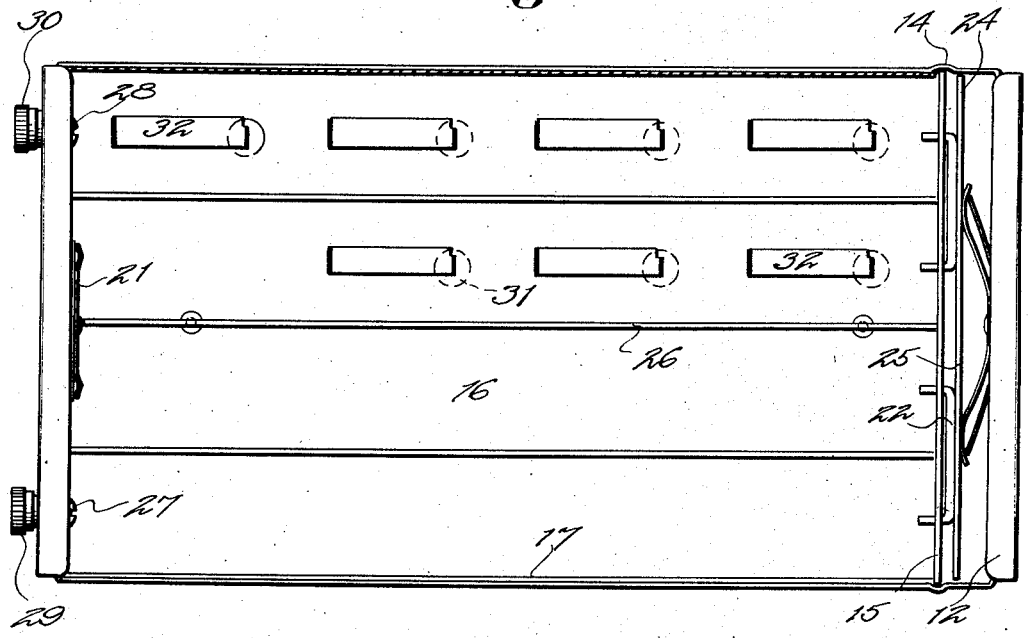
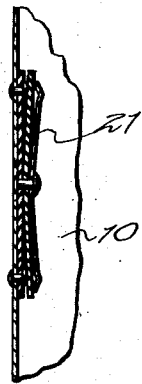
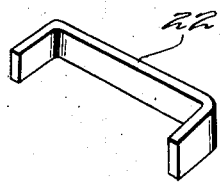
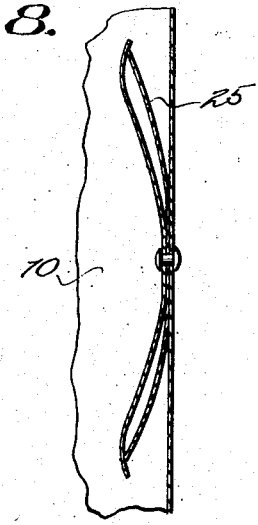
L. V. Stone
W. E. Bailey   INVENTORS
BY Victor J. Evans
ATTORNEY
WITNESSES:

Patented Jan. 5, 1926.

1,568,927

UNITED STATES PATENT OFFICE.

LOREN V. STONE AND WONSLOW E. BAILEY, OF THERESA, NEW YORK.

RADIOPLATE BATTERY BOX.

Application filed November 21, 1924. Serial No. 751,376.

*To all whom it may concern:*

Be it known that we, LOREN V. STONE and WONSLOW E. BAILEY, citizens of the United States, residing at Theresa, in the county of Jefferson and State of New York, have invented new and useful Improvements in Radioplate Battery Boxes, of which the following is a specification.

This invention relates to batteries used for supplying current to the plate of a vacuum tube in radio apparatus, and has for its object the provision of a novel box for holding a plurality of flash light cells or batteries and equipped with the usual taps or current take-offs whereby different voltages may be applied to the tube plate.

An important object is the provision of a battery box in which the flash light cells may be easily replaced when exhausted so that renewal may be made simply, easily and with very little effort.

Another object is the provision of means for holding the cells in contacting relation without the use of any wire, the contact being direct and being maintained by spring means.

With the above and other advantages in view the invention consists in the details of construction to be hereinafter more fully described and claimed, and illustrated in the accompanying drawings, in which:

Figure 1 is a perspective view of the complete device,

Figure 2 is an elevation with the bottom plate removed,

Figure 3 is a longitudinal section,

Figure 4 is a cross section on the line 4—4 of Figure 2,

Figure 5 is a cross section on the line 5—5 of Figure 2 showing the connections at one end of the series of cells, Figure 6 is a view similar to Figure 2 showing all the cells removed.

Figure 7 is a detail section taken at one end of the box,

Figure 8 is a detail section taken at the other end of the box,

Figure 9 is a detail perspective view of a bridge member,

Figure 10 is a fragmentary section through the box, showing a different form of contact, Figure 11 is a perspective view of the modified contact.

Referring more particularly to the drawings I have shown the device as comprising a flat rectangular box 10 constructed of some suitable metal enameled or otherwise treated to have a pleasing appearance and to increase its durability. The bottom of this box is opened and adapted to be closed by a bottom plate 11 likewise constructed of metal and slidably engaged within guide flanges 12 formed on the ends of the box. The bottom plate has one edge formed with a flange 13 engageable with one side of the box for the purpose of preventing it from being slid too far.

Near one end, the sides of the box are formed with depressions 14 constituting retaining means for a partition strip 15 of insulating material. Within the box is a lining of suitable insulating material which includes a sheet 16 lying against the underside of the top. Disposed against the sides are insulating strips 17. Arranged within the box are flash light cells 18 arranged in rows as shown with the central contact 19 of each engaging the exposed bottom 20 of the next adjacent. This condition is exactly the same in all four of the rows illustrated but it will be observed that the cells are oppositely arranged in the successive rows.

For effecting continuity of the circuit through the cells at one end of the box, we provide a leaf spring 21 secured to and insulated from the end of the box and engaging the central contact of the endmost cell in one row and engaging the bottom of the endmost cell in the next adjacent row. For maintaining continuity at the other end of the box, we provide a pair of U-shaped metallic members 22 which have their arms extending through holes 23 in the partition 15. The arms of one U-shaped member engage against the central contact of one endmost cell and against the bottom of the adjacent endmost cell, while the other U-shaped member contacts with the other two endmost cells. By this particular construction at both ends of the box, it will be seen that all of the cells are in series. Disposed against the outer side of the partition 15 is an insulating strip 24 which is engaged by a double leaf spring 25 riveted or otherwise secured on the end of the box. While it is not essential it is preferable to provide longitudinal partition strips 26 between the successive rows of cells to avoid possible short circuiting.

At the end of the box opposite that equipped with the two U-shaped bridge members, we provide metallic contacts 27 and 28 secured to but insulated from the box and carrying binding posts 29 and 30 respectively which constitute the positive and negative terminals for the entire series of cells. It should be observed that the double spring 25 operates to hold all of the cells in end to end relation and clamped together so that there will be no looseness and consequent poor circuit.

In order that current may be tapped off from different ones of the cells to permit any desired voltage to be applied to the plate of a vacuum tube in a radio set, we provide the top of the box with a plurality of holes 31 opposite certain of the cells in the two last rows. Within the box and lying against the insulating sheet 16 are elongated spring contacts 32 which engage against the outsides of the associated and adjacent cells, it being obvious that the paper wrapping on these cells must be removed to expose the metal so that electrical connection will be made with the contacts 32. These contacts having angular ends 33 which pass through holes in the sheet 15 and which project beyond the holes 31 in the box so that a terminal clip or the like may be easily engaged thereon for drawing off the desired voltage. It is preferable that the top of the box be inscribed or otherwise provided with legends or other indicia designating the voltage to be had at each of these taps.

Instead of using the long L-shaped contact members 32 above described, we prefer to employ the form of contacts and their arrangement disclosed in Figures 10 and 11. In carrying out this modified form of the invention, we provide a plurality of plates 34 which are substantially rectangular in shape with rounded corners and which are designed to interpose between the meeting ends of the successive cells 18. These plates 34 are formed with constricted extensions, neck portions or stems 35 which project through slots 36 in the box in such positions that clips or the like may be engaged thereon for the purpose of tapping off for the battery at any desired voltage. This arrangement is considerably simpler than that involving the elongated L-shaped contact plates 32 but of course it will be understood that the action, from an electrical standpoint, is exactly the same in both instances.

The battery is of course used in exactly the same manner as any other so called "B" battery but has the great advantage of being renewable simply by discarding exhausted cells and putting in new ones. The appearance of the entire device is pleasing and on account of its metal construction it is bound to be durable and therefore capable of use in climates or localities and under other conditions where the ordinary type of battery might not be serviceable.

While we have shown and described the preferred embodiment of the invention it is of course to be understood that we reserve the right to make such changes in the form, construction and arrangement of parts as will not depart from the spirit of the invention or the scope of the subjoined claims.

We claim:

1. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, one side of the box being provided with openings, and plate members arranged at intervals within the box and located between successive cells therein, the plate members having reduced extensions projecting through said openings whereby to permit tapping off of different voltages.

2. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, the box being formed with holes at intervals and contact members within the box projecting through said holes and engaging against the outer electrodes of certain of the cells for permitting tapping off of different voltages.

3. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, said means at one end of the box consisting of an elongated leaf spring secured upon and insulated from the box with its ends engaging respectively against the central contact of one endmost cell in one row and the bottom of the endmost cell in the next adjacent row.

4. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, said means at one end of the box consisting of a partition of insulating material and a pair of U-shaped metallic members carried by the partition and having their arms extending therethrough and engaging the bottom and central contacts of the endmost cells in adjacent rows.

5. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, the box being formed with holes at intervals and contact members within the box projecting through said holes and engaging against the outer electrodes of certain of the cells for permitting tapping off of different voltages, an insulating lining within the box, and a plurality of insulating partitions between the rows of cells.

6. A battery box of the character described comprising a box like receptacle having a removable portion and adapted to contain a plurality of dry cells arranged in end to end relation and in rows, with the central terminal of each engaging the bottom of the one next in advance, the arrangement of the cells in the successive rows being reversed, terminal connections at one end of the box against which the two endmost ones of the entire series of cells contact, means at the ends of the box for making electrical contact between the rows of cells, the box being formed with holes at intervals and contact members within the box projecting through said holes and engaging against the outer electrodes of certain of the cells for permitting tapping off of different voltages, and spring means within the box for holding all the cells in clamped end to end relation.

In testimony whereof we affix our signatures.

LOREN V. STONE.
WONSLOW E. BAILEY.